(12) United States Patent
Scherer et al.

(10) Patent No.: US 10,443,633 B2
(45) Date of Patent: Oct. 15, 2019

(54) FASTENING CLIP

(71) Applicant: ILLINOIS TOOL WORKS INC., Glenview, IL (US)

(72) Inventors: Christian Scherer, Heusenstamm (DE); Frank Eckstein, Giebelstadt (DE); Isaac Tejero Salinero, Sabadell (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 305 days.

(21) Appl. No.: 15/113,455

(22) PCT Filed: Dec. 12, 2014

(86) PCT No.: PCT/US2014/070092
§ 371 (c)(1),
(2) Date: Jul. 22, 2016

(87) PCT Pub. No.: WO2015/116320
PCT Pub. Date: Aug. 6, 2015

(65) Prior Publication Data
US 2017/0009789 A1    Jan. 12, 2017

(30) Foreign Application Priority Data
Jan. 30, 2014   (DE) .................. 10 2014 101 119

(51) Int. Cl.
*F16B 21/06* (2006.01)
*F16B 1/00* (2006.01)
(Continued)

(52) U.S. Cl.
CPC ........ *F16B 1/0071* (2013.01); *F16B 19/1081* (2013.01); *F16B 21/065* (2013.01); *F16B 21/086* (2013.01); *F16B 37/04* (2013.01)

(58) Field of Classification Search
CPC .......................... F16B 19/1081; F16B 21/065
(Continued)

(56) References Cited

U.S. PATENT DOCUMENTS 3,426,817 A * 2/1969 Andrews ............... F16B 37/043
411/173
6,406,235 B1 * 6/2002 Bantle ..................... F16B 12/14
411/41
(Continued)

FOREIGN PATENT DOCUMENTS

DE      102004025698 A1    12/2005
DE      102011009683 A1     8/2012
WO         2014006894 A1     1/2014

OTHER PUBLICATIONS

ISR and WO for PCT/US2014/070092 dated Apr. 14, 2015.

*Primary Examiner* — Flemming Saether
(74) *Attorney, Agent, or Firm* — Piloff Passino & Cosenza LLP; Martin J. Cosenza

(57) ABSTRACT

The invention relates to a fastening clip for fastening a component on a carrier component, comprising a latching element for insertion into a fastening opening of the carrier component and having latching means for latching to the fastening opening, further comprising an arresting element which, in the case of the latching element being inserted into the fastening opening of the carrier component, is insertable into an arresting opening of the latching element, wherein mechanical blocking means, which are adjustable between a blocking position, in which full insertion of the arresting element into the arresting opening is prevented, and an unblocking position, in which full insertion of the arresting element into the arresting opening is enabled, are provided, the mechanical blocking means, in the case of the latching element not being inserted into the fastening opening of the carrier component, being situated in their blocking position (Continued)

and, by way of insertion of the latching element into the fastening opening of the carrier component, being adjusted into their unblocking position.

6 Claims, 7 Drawing Sheets

(51) Int. Cl.
*F16B 19/10* (2006.01)
*F16B 21/08* (2006.01)
*F16B 37/04* (2006.01)

(58) Field of Classification Search
USPC .............................................. 411/45–48, 970
See application file for complete search history.

(56) References Cited

U.S. PATENT DOCUMENTS

| | | | | |
|---|---|---|---|---|
| 6,533,515 | B2 * | 3/2003 | Meyer | F16B 19/1081 |
| | | | | 24/453 |
| 8,342,460 | B2 * | 1/2013 | Binkert | F16B 19/1081 |
| | | | | 24/295 |
| 9,903,407 | B2 * | 2/2018 | Hattori | F16B 37/02 |
| 2012/0192388 | A1 | 8/2012 | Demerath et al. | |
| 2014/0056663 | A1 * | 2/2014 | Fukumoto | F16B 19/1081 |
| | | | | 411/22 |
| 2015/0159687 | A1 | 6/2015 | Fukumoto et al. | |

* cited by examiner

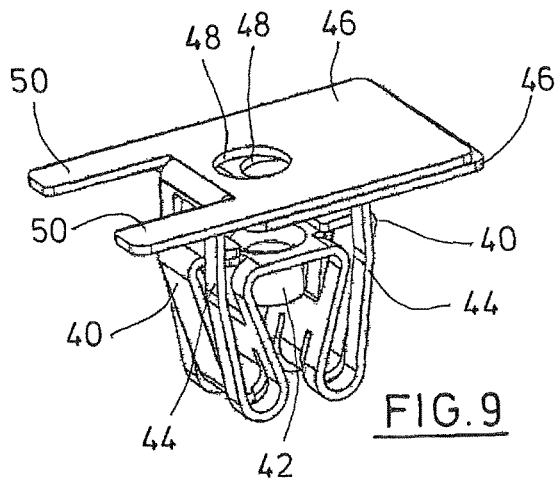
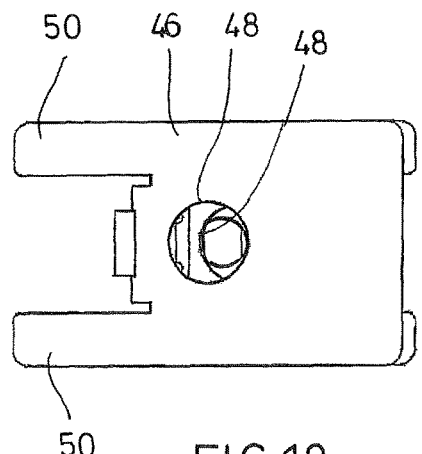
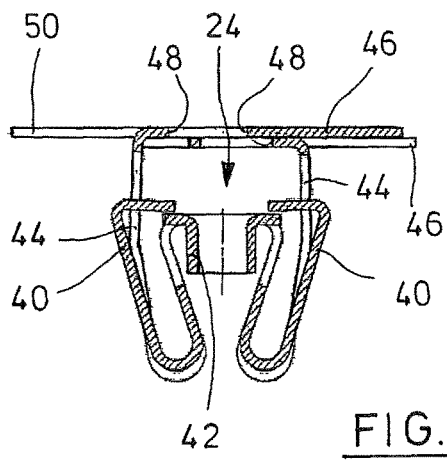
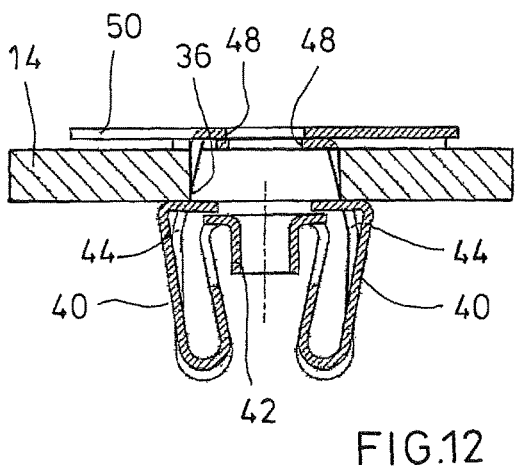
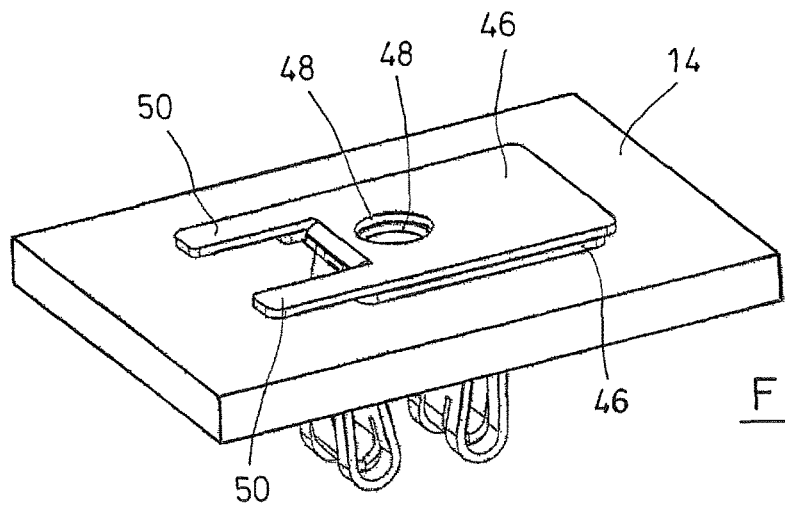

FASTENING CLIP

RELATED APPLICATIONS

The present application is a National Phase of International Application Number PCT/US2014/070092, filed Dec. 12, 2014, and claims priority to German Application Number 10 2014 101 119.8, filed Jan. 30, 2014.

BACKGROUND

The invention relates to a fastening clip for fastening a component on a carrier component, comprising a latching element for insertion into a fastening opening of the carrier component and having latching means for latching onto the fastening opening, further comprising an arresting element which, in the case of the latching element being inserted into the fastening opening of the carrier component, is insertable into an arresting opening of the latching element.

By way of fastening clips of this type, components are fastened on carrier components of an automobile. For example, airbag modules or trim parts can be fastened on body components by way of fastening clips of this type. To this end, the latching element is inserted into a fastening opening of the carrier component. An arresting element, for example an arresting pin, is inserted into an arresting opening of the latching element. In the assembled state, the latching element and therefore the fastening clip can no longer be unblocked from the fastening opening of the carrier component. The component to be fastened on the carrier component can be fastened on the latching element or the arresting element or both. It is also possible that it is held in a clamped manner, for example, between fastening faces which face one another of the latching element and the arresting element or between fastening faces which face one another of the carrier component and the arresting element or latching element.

It has to be ensured that the fastening clip is assembled as intended on the carrier component. DE 10 2011 009 683 A1 discloses a fastening clip, in which an unblocking element is provided which is moved from a first position into a second position during assembly. In the first position, a machine-readable code which is attached to the fastening clip cannot be read off, whereas the machine-readable code can be read off in the second position. The second position is reached in the final assembly position. In this way, it is intended to be possible to check the assembly as intended of the fastening clip. It is a problem, however, that the unblocking element can also reach the second position, in which the machine-readable code can be read off, if the fastening clip is not assembled as intended on the carrier component. In other words, although the assembly as intended of the fastening clip per se is monitored, faulty assembly of the fastening clip on the carrier component is not detected.

SUMMARY OF THE INVENTION

Proceeding from the described prior art, the invention is based on the object of providing a fastening clip of the type mentioned at the outset which affords improved detection of faulty assembly.

The invention achieves the object.

For a fastening clip of the type mentioned at the outset, the invention achieves the object by virtue of the fact that mechanical blocking means, which are adjustable between a blocking position, in which full insertion of the arresting element into the arresting opening is prevented, and an unblocking position, in which full insertion of the arresting element into the arresting opening is enabled, are provided, the mechanical blocking means, in the case of the latching element not being inserted into the fastening opening of the carrier component, being situated in their blocking position and, by way of insertion of the latching element into the fastening opening of the carrier component, being adjusted into their unblocking position.

As has already been mentioned, the carrier component is, in particular, a carrier component of an automobile, for example a body component. The component which is to be fastened on the carrier component can be, for example, an airbag module or trim part. As has likewise been explained at the outset, the component which is to be fastened on the carrier component can be fastened to this end on the latching element and/or on the arresting element or can be clamped in, for example, between said elements. The component can also be clamped in between faces which face one another of the carrier component and the latching element or arresting element.

The latching element is inserted into the fastening opening, in particular a through-bore, of the carrier component. In particular in the case of full insertion, the latching on the fastening opening occurs. Here, the latching also cannot take place until during the (in particular, full) insertion of the arresting element into the arresting opening of the latching element. The arresting element can prevent, for example in the fully inserted state, it being possible for latching legs of the latching element to move (back) into a position, in which the latching element can be unblocked from the fastening opening. The latching element and the arresting element can be fundamentally separate elements or they can be configured in one piece. In the latter case, the separation of the latching element and the arresting element can take place during the assembly of the fastening clip. It is also possible, however, that a single-piece connection of this type is configured in such a way that the latching element and the arresting element can be moved relative to one another. In this case, the single-piece connection can also remain during the assembly.

According to the invention, mechanical blocking means are provided which are adjustable between a blocking position and an unblocking position. In the blocking position, full insertion of the arresting element into the arresting opening is prevented. Assembly as intended of the fastening clip is therefore not possible in the blocking position. In the unblocking position, in contrast, full insertion of the arresting element into the arresting opening and therefore assembly as intended of the fastening clip are made possible. If the latching element is not inserted (fully) into the fastening opening of the carrier component, the mechanical blocking means are situated in their blocking position. During the (full) insertion of the latching element into the fastening opening of the carrier component, the mechanical blocking means are adjusted into their unblocking position. In the blocking position, the mechanical blocking means close the arresting opening at least in portions, with the result that the arresting element can be inserted into the arresting opening only at most until the closure by way of the blocking means. This closure is canceled in the unblocking position.

In contrast to the prior art, the invention is therefore based on the concept of mechanically preventing assembly of the arresting element on the latching element as long as the latching element is not assembled as intended on the carrier component. The abovementioned faulty assembly which is possible in the prior art is ruled out according to the invention. As will be explained in further detail below, indication means of different form can additionally be provided which indicate full assembly as intended of the arresting element on the latching element. An OK indication in relation to the assembly is possible only when both the latching element is assembled as intended on the carrier component and the arresting element is assembled as intended on the latching element.

As has already been mentioned, the mechanical blocking means can permit partial insertion of the arresting element into the arresting opening for pre-assembly of the arresting element on the latching element even in the blocking position. The closure by way of the blocking means is then arranged spaced apart from the entry of the arresting opening in the introduction direction of the arresting element. The arresting element can be inserted for pre-assembly as far as this location. It can be arrested temporarily in said pre-assembly position, for example by way of a suitable latching connection or partial screwing of the arresting element into an internal thread. Pre-assembled delivery of the fastening clip is therefore possible, as a result of which assembly is simplified.

The arresting opening can have, for example, a hollow-cylindrical basic shape. As viewed in the introduction direction of the arresting element, the arresting opening can have different portions, for example latching portions, threaded portions or the like.

The latching element can comprise at least one actuating portion which, when the latching element is inserted into the fastening opening, is actuated in such a manner that the mechanical blocking means are adjusted into their unblocking position. It can then be provided, furthermore, that the actuating portion comprises at least one elastic arm which, when the latching element is inserted into the fastening opening of the carrier component, is pressed inward, from a rest position into an actuating position, by an edge of the fastening opening, the at least one elastic arm being connected to at least one blocking portion which, in the rest position of the elastic arm, at least partially closes the arresting opening and which, in the actuating position of the elastic arm, unblocks the arresting opening for full insertion of the arresting element.

According to a further refinement, in the rest position of the at least one elastic arm, the at least one blocking portion can at least partially close the arresting opening at its entry provided for the introduction of the arresting element. In this refinement, the closure therefore takes place directly at the entry or start of the arresting opening. The arresting element can therefore not be inserted into the arresting opening at all. As an alternative, it is possible that, in the rest position of the at least one elastic arm, the at least one blocking portion at least partially closes the arresting opening, as viewed in the direction of introduction of the arresting element into the arresting opening, at a distance from the entry of the arresting opening, in such a manner that, for the purpose of pre-assembly, the arresting element can be partially inserted into the arresting opening. Insertion of the arresting element as far as the blocking portion is then possible, in particular for above-described pre-assembly.

It can be provided according to a further refinement that the at least one blocking portion is a plate, which is connected to the at least one elastic arm and has a recess or through-bore, wherein the recess or through-bore, in the rest position of the elastic arm, is at least not entirely aligned with the arresting opening, such that full insertion of the arresting element into the arresting opening is prevented, and wherein the recess or through-bore, in the actuating position of the elastic arm, is aligned with the arresting opening in such a manner that full insertion of the arresting element into the arresting opening is enabled.

It can be provided according to a further refinement that at least two elastic arms, which are each connected to a plate-like blocking portion, are provided, wherein the at least two plate-like blocking portions, in the rest position of the at least two elastic arms, at least partially close the arresting opening, such that full insertion of the arresting element into the arresting opening is prevented, and wherein the at least two plate-like blocking portions, in the actuating position of the at least two elastic arms, unblock the arresting opening, such that full insertion of the arresting element into the arresting opening is enabled.

It can also be provided that the at least two plate-like blocking portions each have a preferably semi-circular recess or through-bore, wherein the recesses or through-bores, in the rest position of the at least two elastic arms, are offset in relation to one another in such a manner that the plate-like blocking portions at least partially close the arresting opening, and wherein the recesses or through-bores, in the actuating position of the at least two elastic arms, are aligned in relation to one another in such a manner that together, they form the delimitation of the arresting opening and insertion of the arresting element into the arresting opening is enabled.

The latching element can comprise one or more latching legs, wherein the one or more latching legs, in the state when inserted into the fastening opening of the carrier component, latches or latch to the fastening opening. The latching can be carried out, in particular, in the state when inserted fully into the fastening opening. Here, the latching legs of the latching element can have blocking means which, when the arresting element is fully inserted into the arresting opening, prevent the latching from disengaging from the fastening opening of the carrier component. Blocking means of this type can be, for example, spreading elements which, in the state when inserted fully into the arresting opening, bear against a head of an arresting element which is configured as an arresting pin. In this blocking state, the movement of the latching legs toward one another is prevented, with the result that undesired disengaging of the latching of the latching legs is ruled out.

As has already been mentioned at the outset, indication means, which indicate full insertion of the arresting element into the arresting opening, can also be provided. The indication means can be visual indication means or else haptic indication means. In particular, it can be provided that the indication means comprise at least one deformable portion, which is formed on a head of the arresting element and is deformed in the process of full insertion of the arresting element into the arresting opening and thus indicates that full insertion of the arresting element into the arresting opening has taken place. For example, the deformable portion can have a certain color which can differ from the color of the head. As a result, the deformable portion becomes visible, for example, as a ring of contrasting color around the head when assembly as intended has taken place. It goes without saying that other visual indication means or else haptic indication means are also possible. Moreover, visual indication means can comprise, for example, movable arms or the like which are adjusted in the process of assembly into a defined position which then indicates assembly as intended.

The arresting element can be an arresting pin. Said arresting pin can be configured with or without an external thread. If it has an external thread, the arresting opening has a corresponding internal thread. This can be configured, for example, on a hollow-cylindrical tube which is arranged in the introduction opening. It can be provided, furthermore, that the arresting pin has an external thread and the latching element, on its arresting opening, has a corresponding internal thread, wherein the arresting pin, for insertion into the arresting opening, has its external thread screwed into the internal thread, and wherein a limit torque for screwing-in action is defined, this limit torque indicating when the arresting pin has been fully inserted into the arresting opening. In this case, the assembly is therefore checked via a limit torque being reached which can be set, for example, on the assembly tool.

The invention also relates to a system consisting of a fastening clip according to the invention and of a carrier component and/or of a component to be fastened on a carrier component.

Exemplary embodiments of the invention will be explained in greater detail in the following text using drawings, in which, diagrammatically:

BRIEF DESCRIPTION OF THE DRAWINGS

FIG. 9 shows a latching element of a fastening clip according to a second exemplary embodiment in a perspective view, FIG. 10 shows the latching element from FIG. 9 in a plan view, FIG. 11 shows the latching element from FIG. 9 in a cross section, FIG. 12 shows the latching element from FIG. 9 in an assembled state in a cross section, FIG. 13 shows the latching element from FIG. 12 in a perspective view.

DETAILED DESCRIPTION

Figure 1:
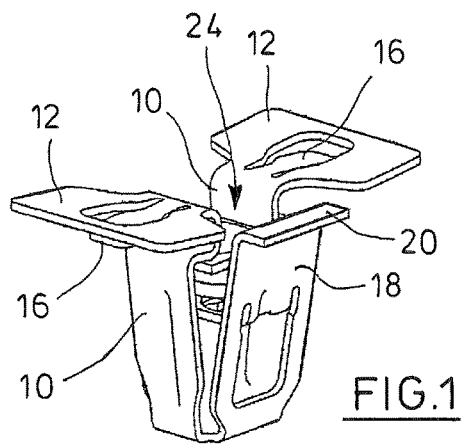
FIG. 1 shows a latching element of a fastening clip according to a first exemplary embodiment in a perspective view.
Figure 2:
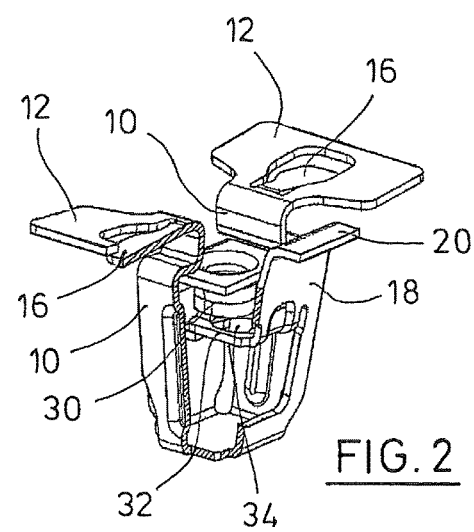
FIG. 2 shows the latching element from FIG. 1 in a partially sectioned perspective view.

In so far as nothing else is specified, identical designations denote identical objects in the figures. FIGS. 1 and 2 show a latching element of a fastening clip according to a first exemplary embodiment. The latching element has two latching legs 10 which lie opposite one another and at the upper end of which in each case one angled-away portion 12 is formed which, in the assembled state, rests on the upper side of a carrier component 14 (shown, for example, in FIG. 3) of an automobile, for example a body component. The angled-away portions 12 have in each case one elastic tongue section 16. In the assembled state, a component which is to be fastened on the carrier component 14, for example an airbag module, can be fastened on or under the angled-away portions 12. Moreover, the latching element has an elastic arm 18 which is likewise angled away at its upper end, as shown at 20. FIGS. 1 to 4 show the elastic arm 18 in its rest position. A stationary portion 22 is provided so as to lie opposite the elastic arm 18. An introduction opening 24 for an arresting pin 26 (shown in FIGS. 3 and 4) is formed between the latching legs 10, the elastic arm 18 and the stationary portion 22. In the example which is shown, the arresting pin 26 has an external thread (not shown) and a head 28, into which a turning tool can engage for screwing the arresting pin 26 into the introduction opening 24. To this end, the introduction opening 24 has a tubular portion 30 which can be seen in FIG. 2, is formed on the stationary portion 22, and has an internal thread which corresponds to the external thread of the arresting pin 26.

Figure 3:
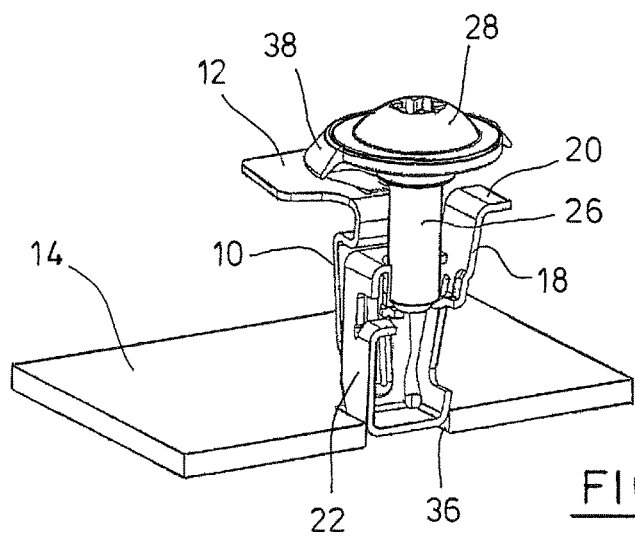
FIG. 3 shows a fastening clip comprising the latching element from FIG. 1 in a pre-assembly position in a partially sectioned perspective view.
Figure 4:
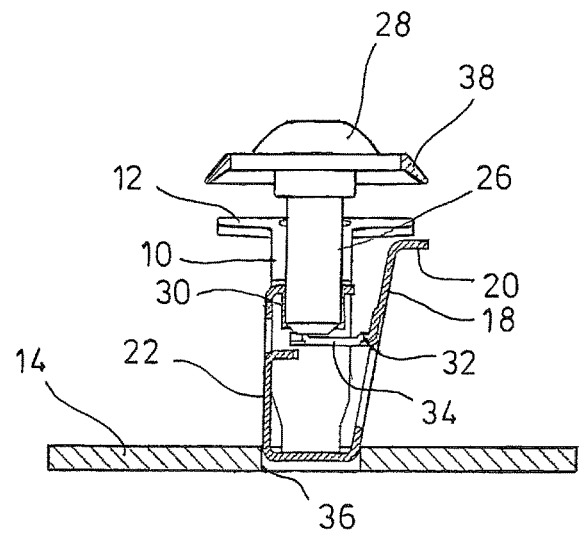
FIG. 4 shows the view from FIG. 3 in a cross section.
Figure 5:
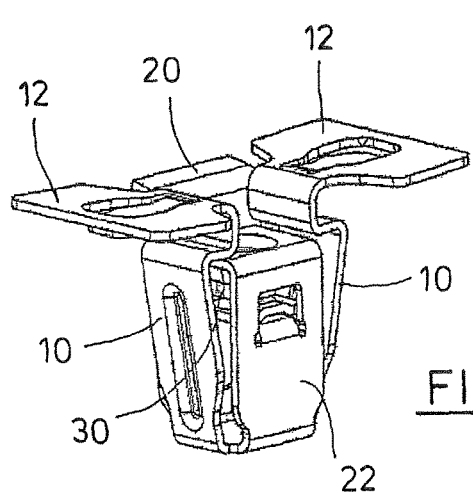
FIG. 5 shows the latching element from FIG. 1 in a second perspective view.
Figure 6:
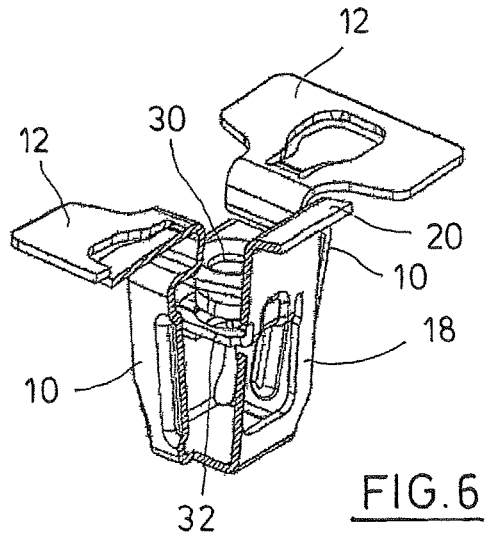
FIG. 6 shows the latching element from FIG. 1 in a further partially sectioned perspective view.
Figure 7:
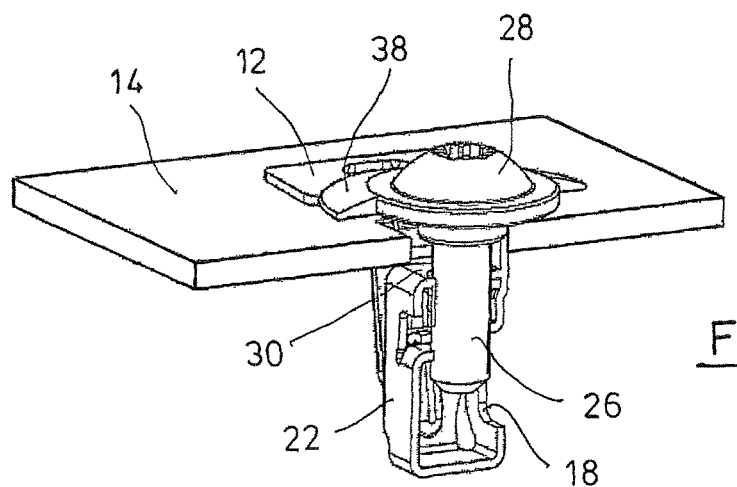
FIG. 7 shows the fastening clip from FIG. 3 in a completely assembled position in a perspective view.
Figure 8:
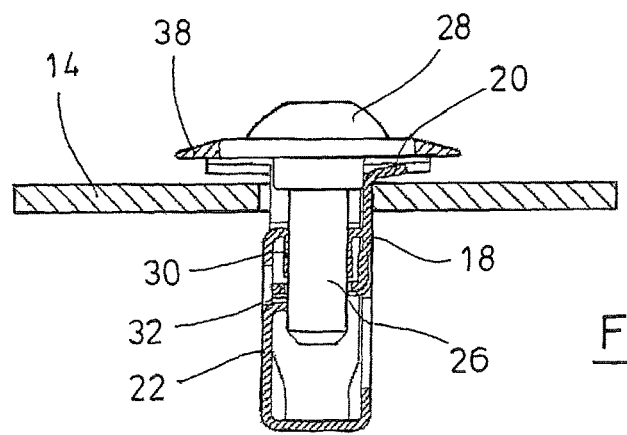
FIG. 8 shows a cross section through the illustration from FIG. 7.

It can be seen, for example, in FIGS. 2 and 4 that the elastic arm 18 is connected to a plate 32 with a through-bore 34. In the rest state (shown in FIGS. 1 to 4) of the elastic arm 18, the bore 34 is not aligned with the through-opening of the tubular portion 30 and to this extent the arresting opening 24. In this state, the arresting pin 26 can therefore be inserted into the arresting opening 24 only until the plate 32 is reached. The arresting pin 26 butts onto the plate 32, as can be seen in FIG. 4. In this exemplary embodiment, the plate 32 is configured so as to be spaced apart from the entry of the arresting opening 24 in the introduction direction of the arresting pin 26, that is to say from top to bottom in FIG. 4, with the result that the arresting pin 26 can be pre-assembled as far as the position which is shown in FIGS. 3 and 4. Here, the arresting pin 26 can already be screwed partially into the tubular portion 30. In this state, the latching element is inserted with the arresting pin 26 into a fastening opening 36 of the carrier component 14. In the course of the insertion into the fastening opening 36, the elastic arm 18, in particular, is pressed elastically inward. Moreover, the latching legs 10 latch on the fastening opening 36. FIGS. 5 and 6 show the latching element in the state in which it is inserted into the fastening opening 36, the carrier component 14 with the fastening opening 36 not being shown for reasons of illustration. It can be seen that the plate 32 with the through-bore 34 is now oriented so as to be aligned with respect to the through-bore of the tubular portion 30, with the result that the arresting pin 26 can now be screwed fully into the arresting opening 24. This final assembly state can be seen in FIGS. 7 and 8.

Moreover, it can be seen in FIGS. 3, 4 and 7, 8 that a deformable portion 38 is provided which runs in an annular manner around the outer edge of the head 28 of the arresting pin 26 and is pressed onto the carrier component 14 in the course of final assembly and is deformed in the process. As a result, the width of the annular portion 38 changes in plan view. Said annular portion 38 can be configured, for example, in a signal color, in particular a different color than the head 28. As a result, the finally assembled position of the arresting pin 26 in the latching element can be checked visually. It goes without saying that other checking options in this regard are also conceivable.

FIGS. 9 to 13 show a latching element of a fastening clip according to the invention according to a second exemplary embodiment. An arresting pin can be inserted into said latching element, which arresting pin has been described in principle with respect to the exemplary embodiment of FIGS. 1 to 8. The arresting pin is not shown in greater detail for reasons of illustration. The latching element which is shown in FIGS. 9 to 13 has a plurality of elastic latching legs 40. The latching legs 40 carry a tubular portion 42 between themselves with an internal thread which is not shown in greater detail and into which the arresting pin can be screwed. Moreover, elastic arms 44 are formed on the latching element, which elastic arms 44 are connected in each case to a plate-shaped blocking portion 46. The plate-shaped blocking portions 46 have in each case one through-bore 48. In the rest state (shown in FIGS. 9 to 11) of the latching element, in which the latter has not yet been inserted into a fastening opening of a carrier component, the through-bores 48 are not aligned with one another. As a result, it is not possible in this state to insert the arresting pin into the arresting opening 24.

If the latching element is now inserted into a fastening opening 36 of a carrier component 14, as can be seen in FIGS. 12 and 13, the elastic arms 44 are pressed inward, as a result of which the through-bores 48 are oriented so as to be aligned with one another (see FIGS. 12 and 13). In this state, the arresting pin can be inserted into the arresting opening 24. In this exemplary embodiment, a component which is to be fastened on the carrier component 14 can be arranged such that it is clamped, for example, under the clamping arms 50 of the upper plate-shaped blocking portion 46.

Figure 14:
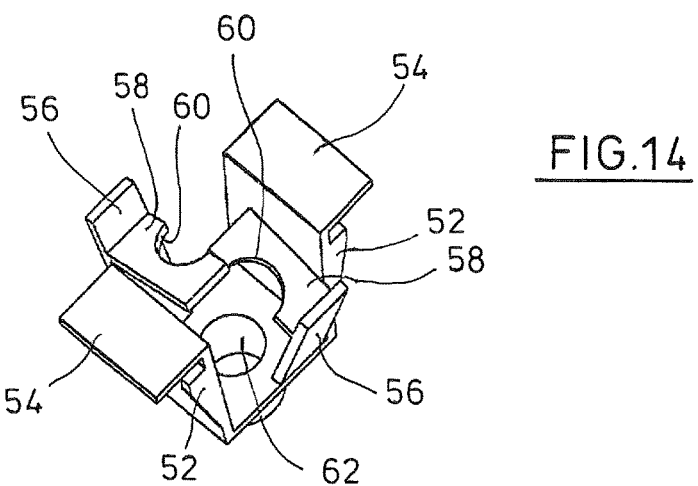
FIG. 14 shows a latching element of a fastening clip according to a third exemplary embodiment in a perspective view.
Figure 15:
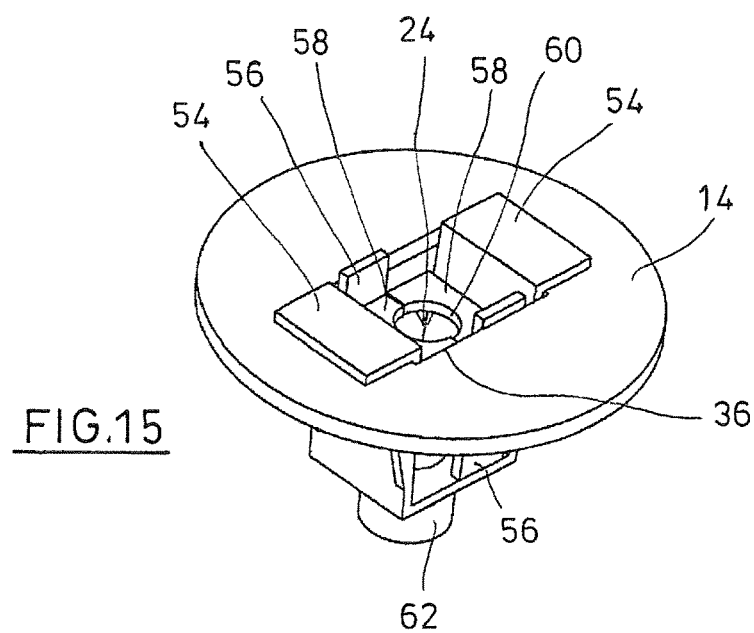
FIG. 15 shows the latching element from FIG. 14 in an assembled state in a perspective view.
Figure 16:
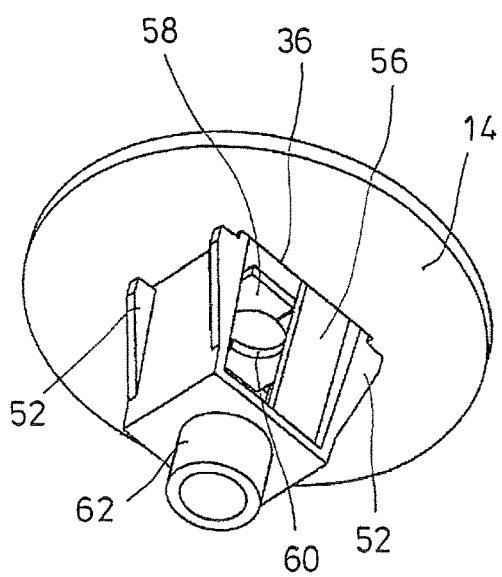
FIG. 16 shows the illustration from FIG. 15 in a second perspective view.

FIGS. 14 to 16 show a latching element of a third exemplary embodiment of a fastening clip according to the invention. The arresting pin is once again not shown for reasons of illustration. It can be configured as explained using FIGS. 1 to 8. The latching element which is shown in the present case has two latching legs 52 which lie opposite one another and at the upper end of which in each case one angled-away portion 54 is formed which, in the assembled state, bears on the surface of the carrier component 14 (see FIG. 15). The latching legs 52 are elastic and, in the course of the insertion of the latching element into the fastening opening 36 of the carrier component 14, latch on said carrier component 14, as can be seen in FIG. 16. Moreover, the latching element has two elastic arms 56 which lie opposite one another. In each case one plate-shaped blocking portion 58 with a semi-circular recess 60 is arranged on the elastic arms 56. Moreover, the latching element has a tubular portion 62 with an internal thread (not shown in greater detail) which is part of the arresting opening 24 of the latching element. In the rest state (shown in FIG. 14) of the latching element, in which the latter has not yet been assembled on the carrier component 14, the plate-shaped blocking portions 58 are situated offset with respect to one another in such a way that the recesses 60 are not oriented with respect to one another. FIG. 14 shows the upper side of the latching element, which upper side forms the entry of the arresting opening 24. An arresting pin therefore cannot be inserted into the arresting opening 24, since said arresting pin would come into contact with the plate-shaped blocking portions 58. In the course of the insertion into the fastening opening 36 of the carrier component 14, the elastic arms 56 are pressed inward, the recesses 60 being oriented with respect to one another in such a way that they together form a delimitation of the arresting opening 24, as can be seen in FIGS. 15 and 16. In this state, an arresting element, in particular an arresting pin, in FIG. 15 can be fully inserted from above into the arresting opening 24. In this case, for example, once again a component which is to be fastened on the carrier component 14 can be held in a clamped manner under the angled-away portions 54 of the latching element. It can be seen that the exemplary embodiment which is shown in FIGS. 14 to 16, just like the exemplary embodiment which is shown in FIGS. 9 to 13, does not permit any insertion at all of the arresting pin into the arresting opening in the state, in which it is assembled on the carrier component 14. As mentioned at the outset, this is different in the exemplary embodiment in FIGS. 1 to 8. There, the arresting pin 26 can be inserted partially into the arresting opening 24 for pre-assembly.

Figure 17:
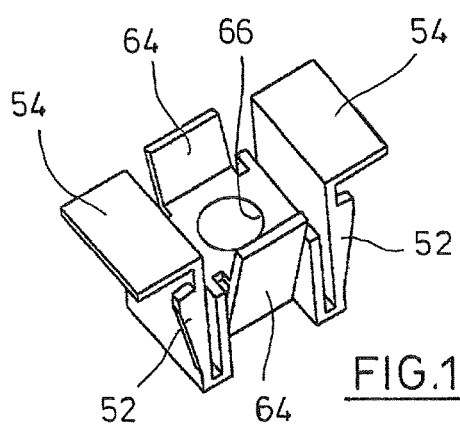
FIG. 17 shows a latching element of a fastening clip according to a fourth exemplary embodiment in a perspective view.
Figure 18:
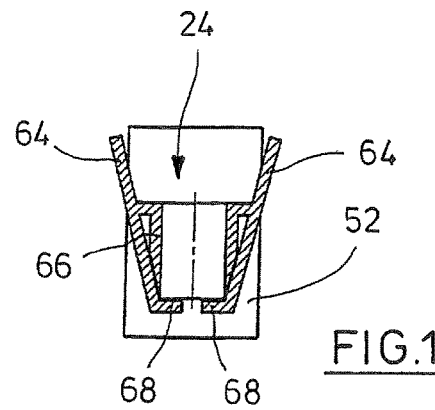
FIG. 18 shows the latching element from FIG. 17 in a cross section.
Figure 19:
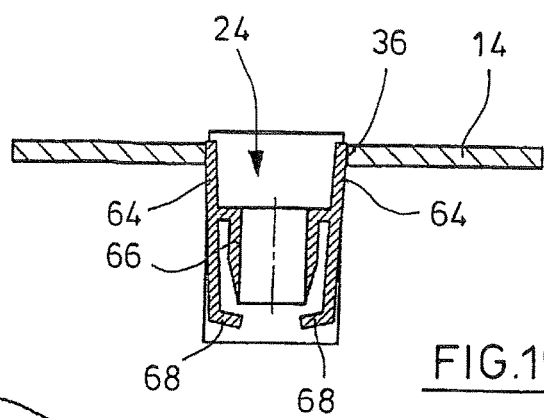
FIG. 19 shows the latching element from FIG. 17 in an assembled state in a cross section.
Figure 20:
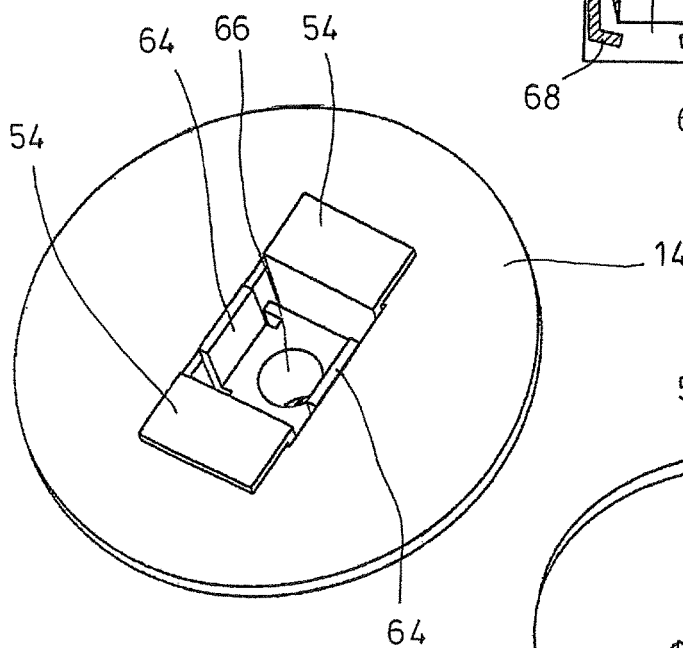
FIG. 20 shows the illustration from FIG. 19 in a perspective view.
Figure 21:
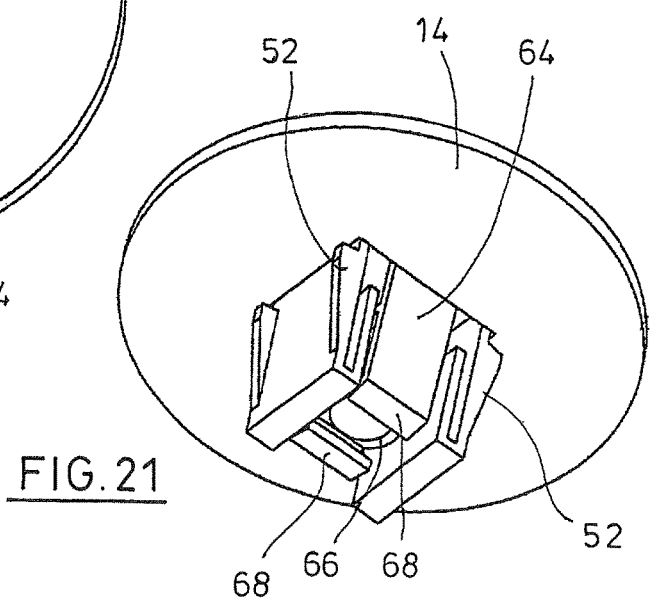
FIG. 21 shows the illustration from FIG. 19 in a further perspective view.

This is also possible in the exemplary embodiment (shown in FIGS. 17 to 21) of a latching element of a fastening clip according to the invention. The latching element which is shown there has a certain similarity to the latching element which is shown in FIGS. 14 to 16. This applies, in particular, to the latching legs 52 and the angled-away portions 54. Said latching element also has two elastic arms 64 which lie opposite one another and a tubular portion 66 which forms part of the arresting opening 24 with an internal thread (not shown in greater detail) for screwing in an arresting pin. FIGS. 17 and 18 show a rest state of the latching element, in which it is not yet assembled on a carrier component 14. As can be seen, on their side which faces away from the entry of the arresting opening 24 (the underside in FIG. 18), the elastic arms 64 have in each case one angled-away plate-shaped blocking portion 68. In the state which is shown in FIGS. 17 and 18, the blocking portions 68 close the arresting opening 24 in a manner which is spaced apart from its entry in such a way that the arresting pin can be inserted into the arresting opening 24 only until the blocking portions 68 are reached. In the course of the insertion of the latching element into the fastening opening 36 of the carrier component 14, however, the elastic arms 64 are pressed inward, the blocking portions 68 being pivoted outward, with the result that they unblock the arresting opening 24 for full insertion of the arresting pin (see FIGS. 19 to 21). In said exemplary embodiment, once again, a component which is to be fastened on the carrier component 14 can be held in a clamped manner, for example, under the angled-away portions 54.

Figure 22:
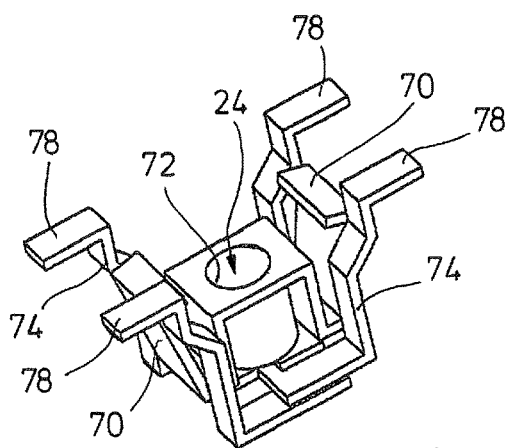
FIG. 22 shows a latching element of a fastening clip according to a fifth exemplary embodiment in a perspective view.
Figure 23:
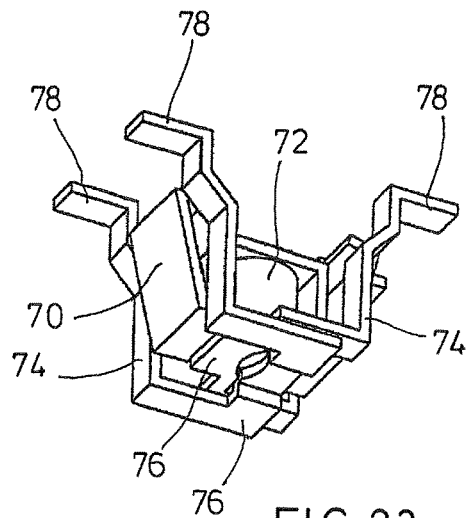
FIG. 23 shows the latching element from FIG. 22 in a second perspective view.
Figure 24:
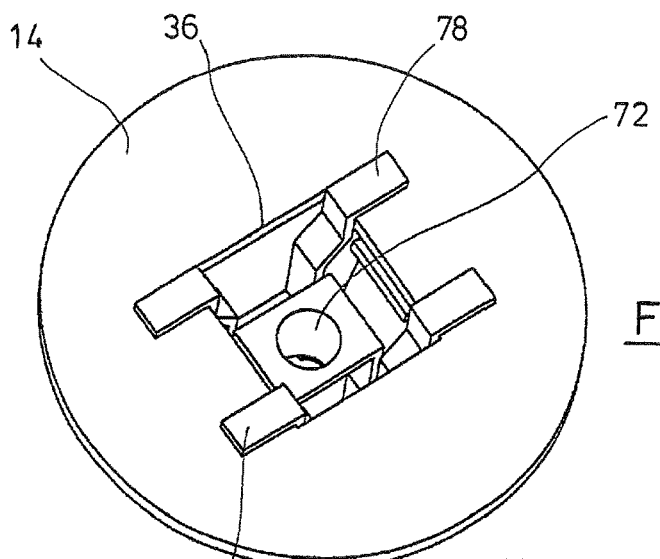
FIG. 24 shows the latching element from FIG. 22 in an assembled state in a perspective view.
Figure 25:
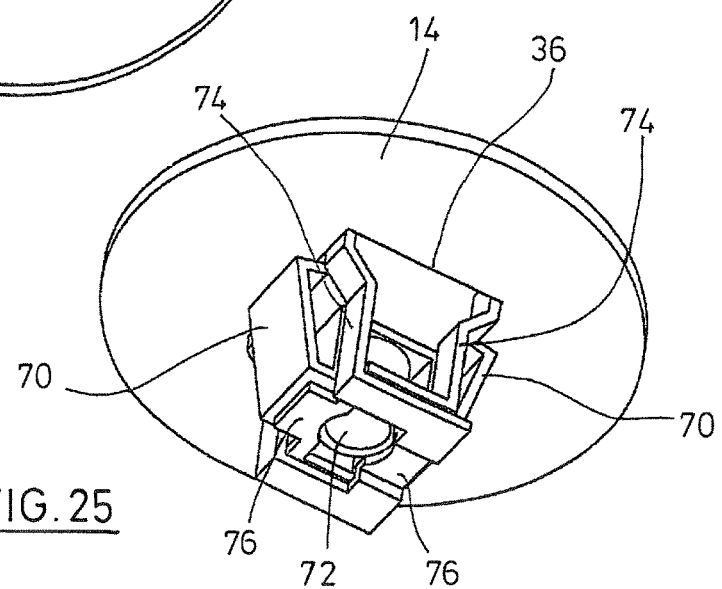
FIG. 25 shows the illustration from FIG. 24 in a second perspective view.

The latching element (shown in FIGS. 22 to 25) of a further exemplary embodiment of a fastening clip according to the invention also permits pre-assembly of the arresting element before the latching element is assembled on the carrier component 14. The latching element has two latching legs 70 which lie opposite one another, are elastic and, during insertion into the fastening opening 36 of the carrier component 14, latch on said fastening opening 36. Once again, a tubular portion 72 with an internal thread (shown in greater detail) is formed on said latching legs 70, the upper side of which, which can be seen in FIG. 22, at the same time forms the entry of the arresting opening 24. Moreover, the latching element has elastic arms 74 which lie opposite one another and at the end of which, which faces away from the entry of the arresting opening 24, plate-shaped blocking portions 76 are formed. On the upper side which lies opposite, the elastic arms 74 have angled-away portions 78 which, in the assembled state, rest on the upper side of the carrier component 14. A component which is to be fastened on the carrier component 14 can be fixed under said angled-away portions 78. In the rest state which is shown in FIGS. 22 and 23 and in which the latching element has not yet been assembled on the carrier component 14, the blocking portions 76 close the underside of the arresting opening 24. An arresting pin can therefore be inserted into the arresting opening 24 until the blocking portions 76 are reached, and can therefore be pre-assembled. In the course of the insertion of the latching element into the fastening opening 36 of the carrier component 14, the elastic arms 74 are pressed inward, with the result that the plate-shaped blocking portions 76 fully unblock the arresting opening 24, with the result that the arresting pin 26 can be fully inserted into the arresting opening 24.

All of the latching elements and/or arresting elements according to the invention can be configured in one piece. They can be composed of a metal material or plastic. In the latter case, they can be manufactured, for example, in a plastic injection molding process. The arresting element, in particular the arresting pin 26, can be a component which is separate in each case from the latching element. However, a single-piece configuration of the latching element and the arresting pin is also conceivable which, for example, is broken open in the course of assembly or remains intact.

Figure 26:
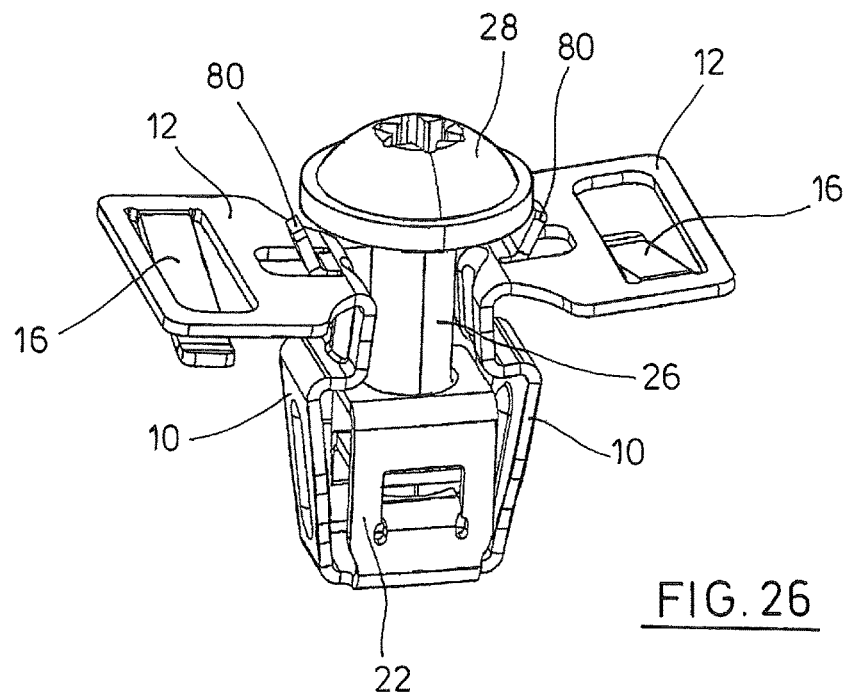
FIG. 26 shows a fastening clip according to a further exemplary embodiment in a pre-assembly position.
Figure 27:
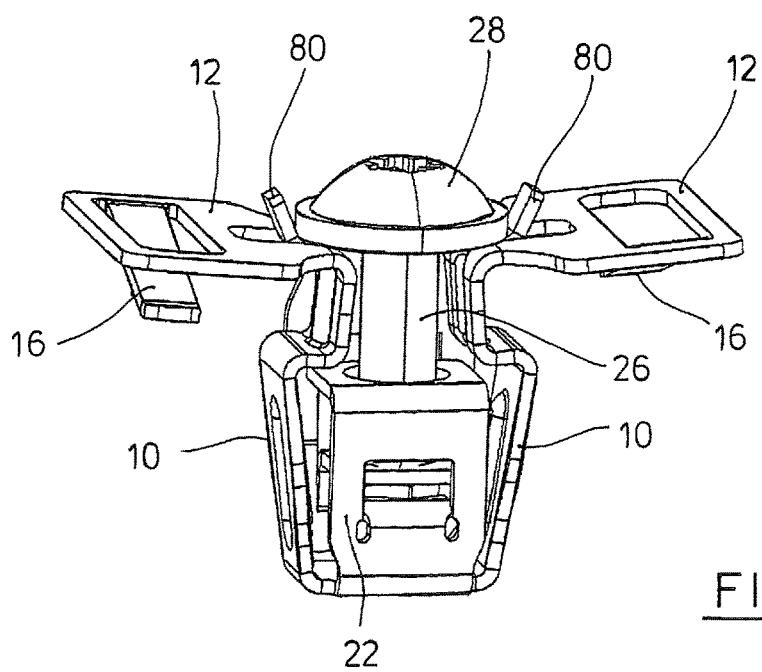
FIG. 27 shows the fastening clip from FIG. 26 in a final assembly position.

FIGS. 26 and 27 show a fastening clip according to a further exemplary embodiment of the invention in two assembly positions. The fastening clip which is shown in FIGS. 26 and 27 corresponds largely to the fastening clip which is shown in FIGS. 1 to 8. To this extent, identical objects are labeled by identical designations, wherein the same designation is used for the elastic tongue portions 16 despite a somewhat different geometry. In addition to the exemplary embodiment which is shown in FIGS. 1 to 8, in each case one spreading element 80 is provided in the angled-away portions 12 in the fastening clip according to FIGS. 26 and 27. In the example which is shown, the spreading elements 80 are formed as a cut-out from the material of the angled-away portions 12 and are directed upward counter to the introduction direction of the arresting pin 26, for example are angled away. In the pre-assembly position which is shown in FIG. 26, the arresting pin 26, in particular its head 28, does not yet come into contact with the spreading elements 80. In the course of the full insertion of the arresting pin 26, however, contact then occurs between the head 28 of the arresting pin 26 and the spreading elements 80, as can be seen in the final assembly position which is shown in FIG. 27. In this state, the head 28 prevents it being possible for the spreading elements 80 to move toward one another. Since, as a cut-out of the angled-away portions 12, they are connected directly to the latching legs 10, it is also prevented as a result that the latching legs 10 can move inward toward one another and therefore undesired disengaging of the latching connection between the latching legs 10 and the fastening opening 36 of the carrier component 14 can occur. The spreading elements therefore bring about blocking of the latching connection of the latching element on the fastening opening 36 of the carrier component 14. As a result, the retaining forces are increased and greater cross-sectional tolerances of the fastening openings are made possible. Although the spreading elements 80 are shown in FIGS. 26 and 27 using a fastening clip as shown in principle in FIGS. 1 to 8, it goes without saying that spreading elements of this type for blocking the latching connection of the latching element on the carrier component in a fully assembled position can likewise be provided in all other exemplary embodiments according to the invention.

As seen in the figures, an embodiment includes two sideways "U" shaped components that latch to the fastening opening such that the legs of the "U" extend above and below wall surfaces of the carrier component and the extension between the legs extends through the hole.

The invention claimed is:

1. A fastening clip for fastening a component on a carrier component, comprising a latching element for insertion into a fastening opening of the carrier component and for latching to the fastening opening, further comprising an arresting element which, in the case of the latching element being inserted into the fastening opening of the carrier component, is insertable into an arresting opening of the latching element, wherein the fastening clip includes a through-bore, the through-bore being adjustable between a blocking position, in which full insertion of the arresting element into the arresting opening is prevented, and an unblocking position, in which full insertion of the arresting element into the arresting opening is enabled, the through-bore, in the case of the latching element not being inserted into the fastening opening of the carrier component, being situated in the blocking position and, by way of insertion of the latching element into the fastening opening of the carrier component, being adjusted into the unblocking position,
wherein the fastening clip has an axis extending from a top to a bottom of the fastening clip, the arresting element traveling along the axis during insertion, and the through-bore is located between the top and the bottom of the fastening clip, wherein the through-bore, in the blocking position, is misaligned with the arresting opening, such that full insertion of the arresting element into the arresting opening is prevented, and the through-bore, in the unblocking position, is aligned with the arresting opening in such a manner that full insertion of the arresting element into the arresting opening is enabled.

2. The fastening clip as claimed in claim 1, wherein the through-bore, for the purpose of pre-assembly, allow partial insertion of the arresting element into the arresting opening even in the blocking position.

3. The fastening clip as claimed in claim 1, wherein the latching element comprises at least one actuating portion which, when the latching element is inserted into the fastening opening, is actuated in such a manner that the through-bore is adjusted into their unblocking position.

4. The fastening clip as claimed in claim 1, wherein indication means, which indicate full insertion of the arresting element into the arresting opening, is also provided.

5. A system consisting of a fastening clip as claimed in claim 1 and of a carrier component and/or of a component to be fastened on a carrier component.

6. A system comprising:
a fastening clip as claimed in claim 1; and
the carrier component and a component to be fastened on the carrier component.

* * * * *